No. 892,452. PATENTED JULY 7, 1908.
E. RODRIGUEZ.
SPRING WHEEL FOR MOTOR CARS AND OTHER VEHICLES.
APPLICATION FILED JULY 23, 1907.
Fig: 1.
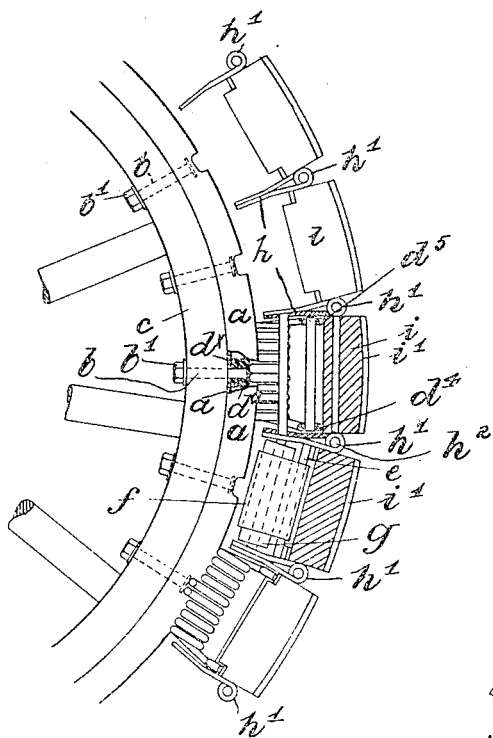
Fig: 4.
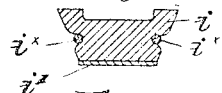
Fig: 5.
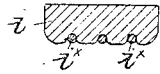
Fig: 5ª.
Fig: 2.
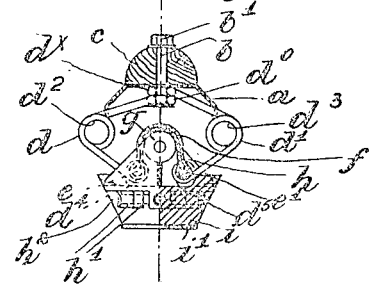
Fig: 3.
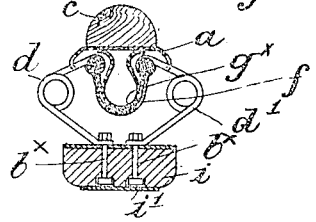
Fig: 6.
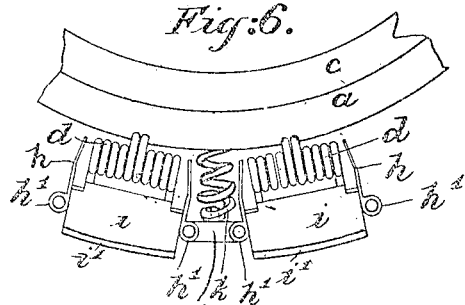
Fig: 7.
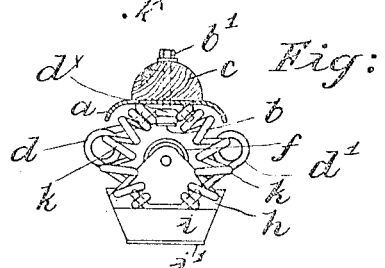
WITNESSES
U. Pettit
Geo. J. Sweeney
INVENTOR
Emilio Rodriguez
By Wm. Wallace White
ATTY.

UNITED STATES PATENT OFFICE.

EMILIO RODRIGUEZ, OF CHISWICK, LONDON, ENGLAND.

SPRING-WHEEL FOR MOTOR-CARS AND OTHER VEHICLES.

No. 892,452.  Specification of Letters Patent.  Patented July 7, 1908.

Application filed July 23, 1907. Serial No. 385,130.

*To all whom it may concern:*

Be it known that I, EMILIO RODRIGUEZ, a subject of the King of Spain, residing at Chiswick, London, England, have invented new and useful Improvements in Spring-Wheels for Motor-Cars and other Vehicles, of which the following is a specification.

This invention relates to spring wheels for use with motor cars and other vehicles.

The object of the present invention is to construct an efficiently resilient wheel adapted for employment in connection with vehicles and consists of the features of construction and combination and arrangement of parts hereinafter described.

In order that the said invention may be clearly understood and readily carried into effect, I will proceed to describe the same with reference to the examples illustrated in the accompanying drawings, in which:—

Figure 1 represents a view of a portion of a wheel having my improvements applied thereto; the view illustrating the sections in various stages of completeness. Fig. 2 is a view of a "section" detached, one half of the figure illustrating the same in end view and the other half in transverse section. Fig. 3 is a transverse section of a similar construction to that shown in Figs. 1 and 2 but showing a means of reversing the arrangement of the parts. Figs. 4 and 5 are transverse sections of blocks or treads provided with binding wires or bands which may be placed as shown or between the springs and the treads. Fig. 5$^a$ is a transverse section of a band somewhat like a flat wire rope. Figs. 6 and 7 are respectively a side view of a portion of a wheel and a transverse section thereof illustrating an alternative arrangement in which a spiral or coil spring is interposed between the several sections for the purpose of absorbing shock.

Referring to the drawings, the invention comprises a rim $a$ which may be made of iron or steel and secured by bolts $b$ to a felly $c$. To each of the bolts $b$ the ends $d°$, $d^\times$ of the spring portions $d$, $d'$ (Fig. 2) are attached: these ends being retained by tightening up the nut $b'$ pertaining to the bolt $b$. The springs are preferably formed as shown and consist each of a doubled wire arranged to form an approximately elliptical figure (see Fig. 2) the wire being coiled as at $d^2$, $d^3$ about an imaginary center situated on the major axis of the ellipse. The ends $d^4$, $d^5$ are respectively connected to floating bars $e$, $e'$, the latter being connected by a leather, chain or other flexible connection $f$ passing over a roller $g$. This roller is mounted in the end pieces $h$, $h$ to which the block or tread $i$ is secured or from which the latter depends thus constituting a kind of suspension. The end pieces $h$, $h$ are provided with lugs or eyes $h'$, $h'$ through which hinge pins $h^2$, $h^2$ are passed; thereby holding the several sections flexibly together.

Upon pressure incidental to the load or the weight of the vehicle being exerted upon a wheel of the above described construction, assuming, say, three of the sections are in contact with the road surface, the effect will be to cause the said three sections to retreat somewhat, the contour of the wheel becoming to a certain extent flattened owing to the sections on either side of the aforesaid sections not in contact with the roadway receding slightly. It will however be understood that the aforesaid movement of the several sections is momentary and that all the sections are, in succession, subjected to a similar action. The springs, upon the retreating action of the blocks taking place, are caused to contract by the roller $g$ being carried radially inwards towards the center of the wheel, this action having the effect of drawing the ends $d^4$, $d^5$ of the respective springs $d$, $d'$ inwards by means of the suspension $f$. The blocks $i$ may be shod with a tread $i'$ which may be composed of leather or other suitable material.

The above described construction may be reversed as shown in Fig. 3 in which the springs $d$, $d'$ are attached by pins or by bolts $b^\times$, $b^\times$ to the block or tread $i$, $i'$ and suspended by means of the saddle or connection $f$ which is arranged about a pin or projection $g^\times$ secured to the rim $a$; the latter being in turn secured to the felly $c$.

In order to provide for retaining the sections in position in the event of a fracture occurring and so enable the car to be run until a suitable opportunity presents itself for replacing them or effecting the necessary repair, the several sections may be bound by means of a wire or of wires $i^\times$ arranged about the tread sections $i$ either below or above the surface of the head in contact with the roadway. A band or bands such as $i^4$ Fig. 5$^a$ may be employed with similar effect. In the case of heavy vehicles there may be interposed between the aforesaid sections a spring such as indicated at $k$ in Figs. 6 and 7 the object being to absorb shock. In this case the hinges $h'$ are connected together by the link $k'$ on which the spring bears.

By the hereinbefore described mode of constructing the wheel, the several sections are rendered readily detachable and renewable, the parts being interchangeable.

Having now described my invention what I claim and desire to secure by Letters Patent is:—

1. In combination, a felly having two springs of elliptical shape connected thereto by a bolt, the ends of the springs connected to cross bolts, a tread suspended upon the said springs by side pieces, a bolt carried by the said side pieces, carrying a roller, a flexible band of leather connected to the said cross bolts of the springs, the said roller resting in the leather band, to flexibly support the tread.

2. In combination, a felly having two springs of elliptical shape connected thereto, carrying the head by flexible connections, and two interposed coil springs connected to links between the said treads.

3. In combination a felly, two springs of elliptical shape connected thereto by a bolt, the side of the said springs being coiled with the center of the coil in the major axis, bolts carried by the ends of the said springs, a flexible leather band connected to the said bolts, a roller, carried by a through bolt in the said tread resting upon the said leather band supporting flexibly the tread, and side pieces connected to the said treads through which is passed a connecting bolt to make the heads continuous.

In testimony whereof I have signed my name to this specification in the presence of two subscribing witnesses.

EMILIO RODRIGUEZ.

Witnesses:
PAULINE RODRIGUEZ,
HELEN FLORENCE MAY.